(12) United States Patent
Miller

(10) Patent No.: US 10,010,217 B1
(45) Date of Patent: Jul. 3, 2018

(54) GRILL WITH SLIDING RACK AND CARRIAGE

(71) Applicant: Gary D. Miller, Little Rock, AR (US)

(72) Inventor: Gary D. Miller, Little Rock, AR (US)

( * ) Notice: Subject to any disclaimer, the term of this patent is extended or adjusted under 35 U.S.C. 154(b) by 0 days.

(21) Appl. No.: 15/686,943

(22) Filed: Aug. 25, 2017

Related U.S. Application Data

(60) Provisional application No. 62/380,804, filed on Aug. 29, 2016.

(51) Int. Cl.
*A47J 37/07* (2006.01)

(52) U.S. Cl.
CPC ....... *A47J 37/0704* (2013.01); *A47J 37/0786* (2013.01)

(58) Field of Classification Search
CPC ..... A47J 37/04; A47J 37/0704; A47J 37/0731
USPC .......................................................... 99/339
See application file for complete search history.

(56) References Cited

U.S. PATENT DOCUMENTS

| | | | | | |
|---|---|---|---|---|---|
| 4,759,341 | A | * | 7/1988 | McFarland | F24C 15/168 126/339 |
| 5,163,358 | A | * | 11/1992 | Hanagan | A47J 37/0713 126/25 R |
| 6,039,039 | A | * | 3/2000 | Pina, Jr. | A23B 4/052 126/25 R |
| 6,308,616 | B1 | * | 10/2001 | Johnson | A47J 37/0704 126/25 R |
| 8,490,614 | B1 | * | 7/2013 | Gregory | A47J 37/0754 126/1 R |
| 9,439,536 | B2 | * | 9/2016 | Blomberg | A47J 37/0704 |
| 2001/0035176 | A1 | * | 11/2001 | Bush, III | A47J 37/0704 126/25 R |
| 2002/0017290 | A1 | * | 2/2002 | Hines, Jr. | A47J 37/01 126/41 R |
| 2006/0266349 | A1 | * | 11/2006 | Beck | F24C 15/16 126/339 |
| 2010/0139643 | A1 | * | 6/2010 | Pliml | A47J 37/0704 126/39 B |
| 2013/0319256 | A1 | * | 12/2013 | Piazzi | A47J 37/0704 99/341 |
| 2014/0020671 | A1 | * | 1/2014 | Handyside | A47J 37/0704 126/25 R |
| 2014/0116265 | A1 | * | 5/2014 | Samaras | A47J 37/0704 99/445 |
| 2014/0261012 | A1 | * | 9/2014 | Perez, Jr. | A47J 37/0694 99/403 |
| 2014/0352551 | A1 | * | 12/2014 | Ducate | A47J 37/0704 99/339 |

(Continued)

*Primary Examiner* — Dana Ross
*Assistant Examiner* — Joe E Mills, Jr.

(57) ABSTRACT

A grill has a cooking assembly positioned inside a heating chamber, where the cooking assembly is configured to slide along a track system positioned inside and extending out from the heating chamber such that the cooking assembly can be slidably removed from the heating chamber. An end plate attached to the slidable cooking assembly is configured to substantially seal the heating chamber when the cooking assembly is slidably removed from the heating chamber. The cooking assembly may comprise multiple cooking surfaces, with each of the cooking surfaces capable of being slidably removed from the heating chamber, with an end plate connected to each cooking surface configured to seal the appropriate end of the heating chamber when the cooking assembly is removed.

16 Claims, 14 Drawing Sheets

(56) References Cited

U.S. PATENT DOCUMENTS

2015/0047512 A1\* 2/2015 Marra ................. A47J 37/0647
  99/339
2015/0184868 A1\* 7/2015 Sharbidre ............... F24C 15/16
  126/339
2015/0238900 A1\* 8/2015 Raus ................. B01D 53/8668
  99/444

\* cited by examiner

GRILL WITH SLIDING RACK AND CARRIAGE

CROSS-REFERENCE TO RELATED APPLICATIONS

This application claims the benefit of U.S. Provisional Patent Application No. 62/380,804, entitled "Grill with Sliding Rack and Carriage" and filed on Aug. 29, 2016. The complete disclosure of said provisional application is hereby incorporated by reference.

STATEMENT REGARDING FEDERALLY SPONSORED RESEARCH OR DEVELOPMENT

Not applicable

BACKGROUND OF THE INVENTION

Cooking on backyard barbecue grills is a popular pastime. As with any form of cooking, maintaining a stable temperature in the cooking chamber of the grill is important for proper food preparation. In addition, it is necessary for the grill operator to periodically access the interior of the grill during the cooking process, whether to rotate the food for additional cooking or check whether the food is completely done.

Typical grill designs require the entire lid of the heating chamber to be lifted in order to access the contents of the grill. This releases heat from the chamber, which ultimately lowers the temperature of the heating chamber. On the other hand, keeping the lid closed for the entire cooking period does not allow the griller to turn, flip, or check the contents of the grill. In addition, opening the lid and reaching into the heating chamber to access food can be dangerous given the high temperatures or flames within the chamber. What is desired is a grill that allows the griller to access the contents of the grill in a safe manner that also works to keep the internal temperature of the heating chamber at a sufficiently constant level.

BRIEF SUMMARY OF THE INVENTION

The present invention is directed to a cooking device and in particular to a grill. It is an object of the present invention to allow the griller to access the contents being grilled while keeping the heating chamber of the grill in a closed position. In various non-limiting embodiments, a grill is provided with a sliding mechanism allowing the grill rack to be slidably removed from the heating chamber. In various embodiments, the grill rack may be a single piece that is slid from one end of the grill heating chamber, or two pieces that each slide from their respective ends of the grill heating chamber.

DETAILED DESCRIPTION OF THE INVENTION

Figure 1:
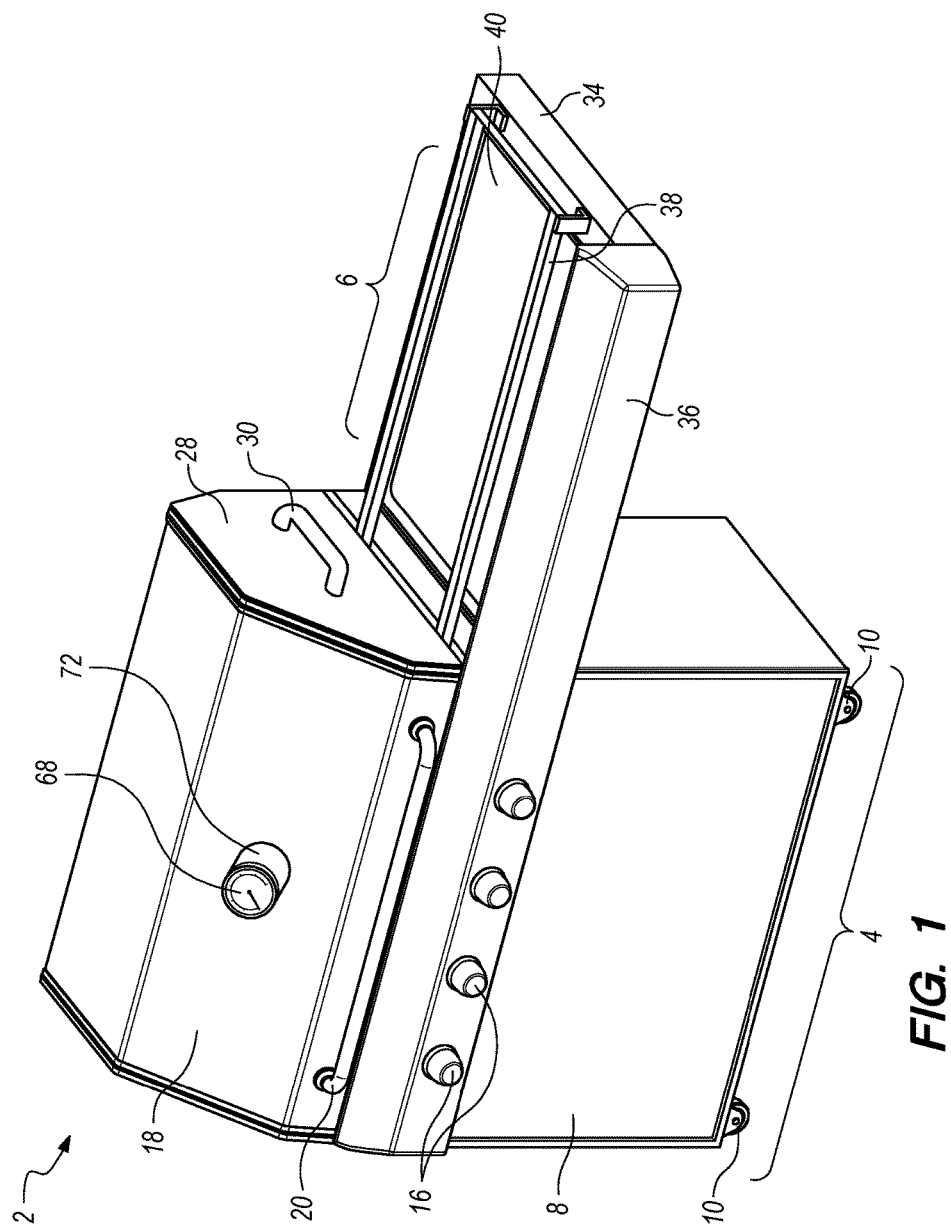
FIG. 1 is a drawing of one embodiment of the present invention showing the lid and sliding assembly in the closed position.

Before the present invention is described in further detail, it should be understood that the invention is not limited to the particular embodiments described, and that the terms used in describing the particular embodiments are for the purposes of describing those particular embodiments only, and are not intended to be limiting, since the scope of the present invention will be limited only by the claims.

With reference now to FIGS. 1-6, one embodiment of the present invention may be described. As shown, in one embodiment, the invention is a grill with a sliding/rolling grill rack and carriage. The grill 2 generally comprises two main sections: the main body 4 and the table extension 6, which extends outwardly from the main body 4. The main body 4 is supported by a base 8, which may, for example, have an internal storage compartment for holding items such as a propane tank (in the context of gas grills) or other grilling accessories. In one embodiment, the base 8 may rest on a number of wheels 10 which are configured to allow the grill 2 to be easily moved. The number of wheels 10 may differ between embodiments depending on the type of mobility desired. For example, in one embodiment, a set of wheels 10 may be placed on the bottom of one side of the base 8 (for example: the left and right corners of the base 8). In such an embodiment, the side of the grill 2 without wheels 10 can be slightly elevated from the ground such that only the wheeled end remains in contact with the ground's surface. The user may then move the grill 2 to a new desired location. Alternatively, for example, a wheel 10 can be placed on each corner of the base 8. In one embodiment (not shown), the table extension may be supported be a number of legs, and each leg may also have a wheel 10. When each corner of the grill 2 has wheels 10, the grill 2 has full mobility and can be moved without requiring one end of the grill 2 to be elevated from the ground. Any size, shape, or type of wheel 10 can be used as known in the art.

In addition to the base 8, the main body 4 also comprises the heating element 12 of the grill 2, which is ultimately used to increase the temperature of the heating chamber 14 (described below) where the food is cooked. Any variety of heating element 12 may be used. While the preferred heating element 12 is described with regard to gas grilling, it is understood that the present invention is not so limited and that any other type of heating element 12 may be used. For example, the novel aspects of the present invention may be equally seen in charcoal grills, electric grills, or other type of grills. Particularly in the case of gas grills or electric grills, control knobs 16 may be positioned on the outside of the main body 4 near to the position of the heating element 12. The control knobs 16 are configured to allow the user to adjust the flow of fuel (in the context of gas grills) or electricity (in the context of electric grills) to the burners or other heating element 12. This gives the user control over the internal temperature of the heating chamber 14 of the grill 2, which ultimately allows for more efficient cooking. The knobs 16 are preferably positioned on a front surface 36, which may in certain embodiments, as shown in the figures, extend the length of the main body section 4 and the table extension section 6.

While any heating element 12 may be used, the preferred type of heating element 12 is described with respect to a gas grill. In the context of a gas grill, the heating element 12 may comprise a number of burners which are used in conjunction with a fuel (for example, propane) to create flames that are capable of both directly cooking the food and increasing the temperature to indirectly cook the food. The burners may be made of a variety of materials, including brass, stainless steel, or cast iron, and may be a variety of shapes, as are known in the art. In addition to the burners, the heating element 12 may also comprise a number of heat plates, with one heat plate preferably corresponding to one burner. The heat plates are configured to distribute heat from the burner flame across the entire cooking surface 22 (described more fully below), which allows for even heating throughout the cooking surfaces 22, 24. The heat plates also generally help reduce flare ups, which are characterized as bursts of intense flames typically caused by oil or fat dripping directly from the food into the heat source or burner.

A lid 18 is attached to the base 8 of the main body 4 in order to create an internal compartment when the lid 18 is closed, which works as the heating chamber 14 of the grill 2. The lid 18, for example, may be attached to the base 8 of the main body 4 by means of a hinge. Still other means for connecting the lid 18 to the base 8 may be implemented. Alternatively, the lid 18 may be a separate piece that is configured to simply sit on top of the base 8. In any event, the lid 18 preferably comprises a handle 20 that allows the user to move the lid 18 to either an open position or a closed position. The open position is characterized as the lid 18 being lifted away from the base 8 of the main body 4 such that the internal components are exposed. In traditional grilling devices, this open position is the only way for the user to access the cooking grates or grill racks. The current invention, however, allows the user to access the cooking surfaces 22, 24 (and therefore any food being cooked on those components) while the lid 18 is in either of the open or closed positions. This feature is described in more detail below. The closed position is characterized as the lid 18 being placed such that a substantially complete seal is created between the bottom edge of the lid 18 and the top edge of the base 8, thereby creating an enclosed heating chamber 14. One of two side panels 28, 32 acts to further facilitate the seal (as described more fully below with regard to the sliding assembly 26). The seal is characterized as being sufficient to enclose the internal components and trap any heat inside the heating chamber 14, thereby allowing the temperature of the heating chamber 14 to rise to the level necessary for complete cooking of the food inside.

As described above, the present invention also comprises a cooking surface 22. In the preferred embodiment, the cooking service 22 is a cooking rack and is the surface upon which the food being grilled is placed. While the cooking rack 22 can take any shape and be made of any material, the preferred embodiment comprises a cooking rack 22 made of a durable material such as stainless steel or cast iron, possibly with a ceramic coating to reduce the sticking of food to cooking rack 22. As shown in FIGS. 2-6, the cooking rack 22 is preferably made up of the durable material in a grid-like pattern. The number of cooking racks 22 may be changed according to multiple embodiments of the present invention depending on the size, shape, and preferred cooking method desired.

Figure 2:
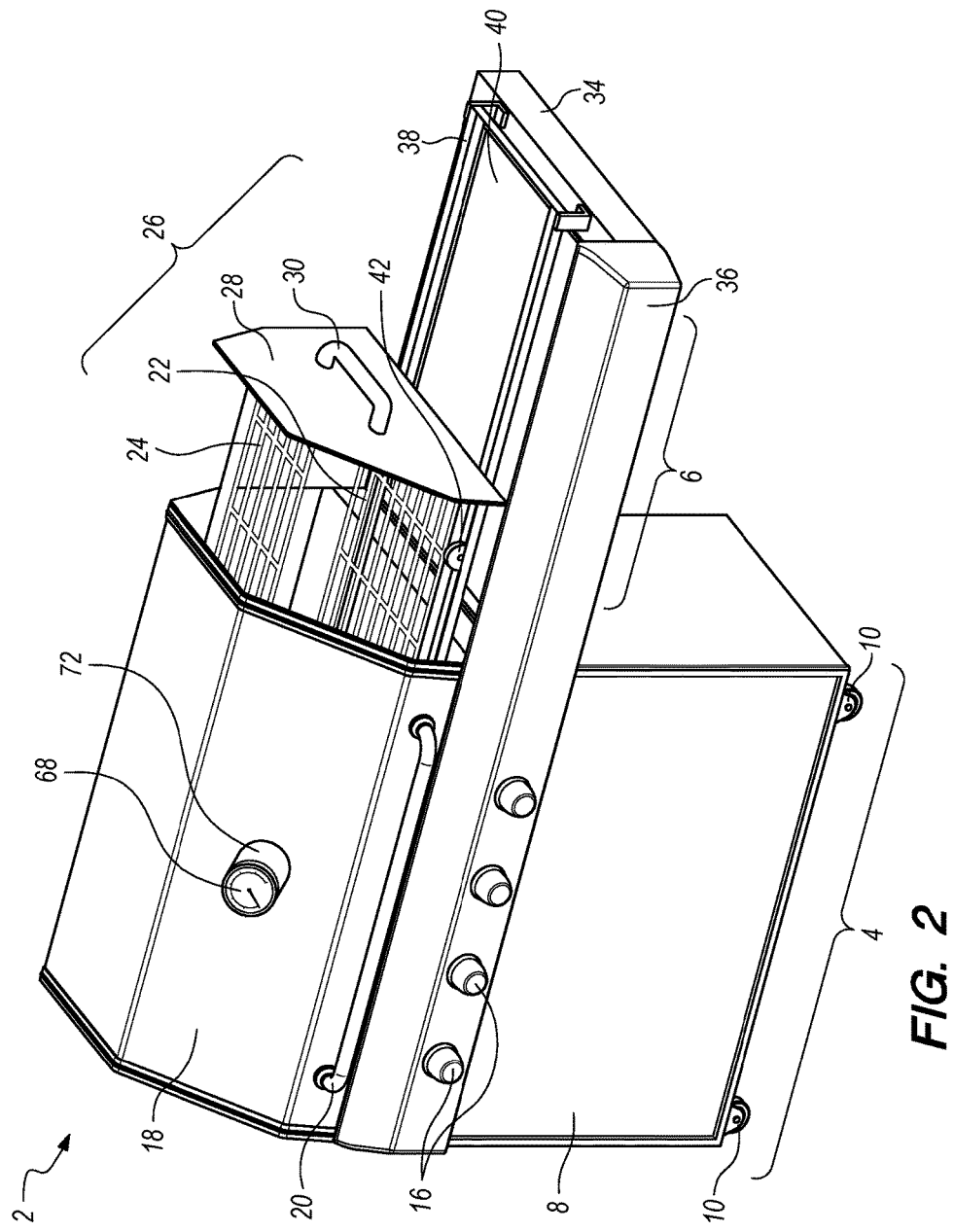
FIG. 2 is a drawing of one embodiment of the present invention showing the lid in the closed position and the sliding assembly in a partially open position.
Figure 3:
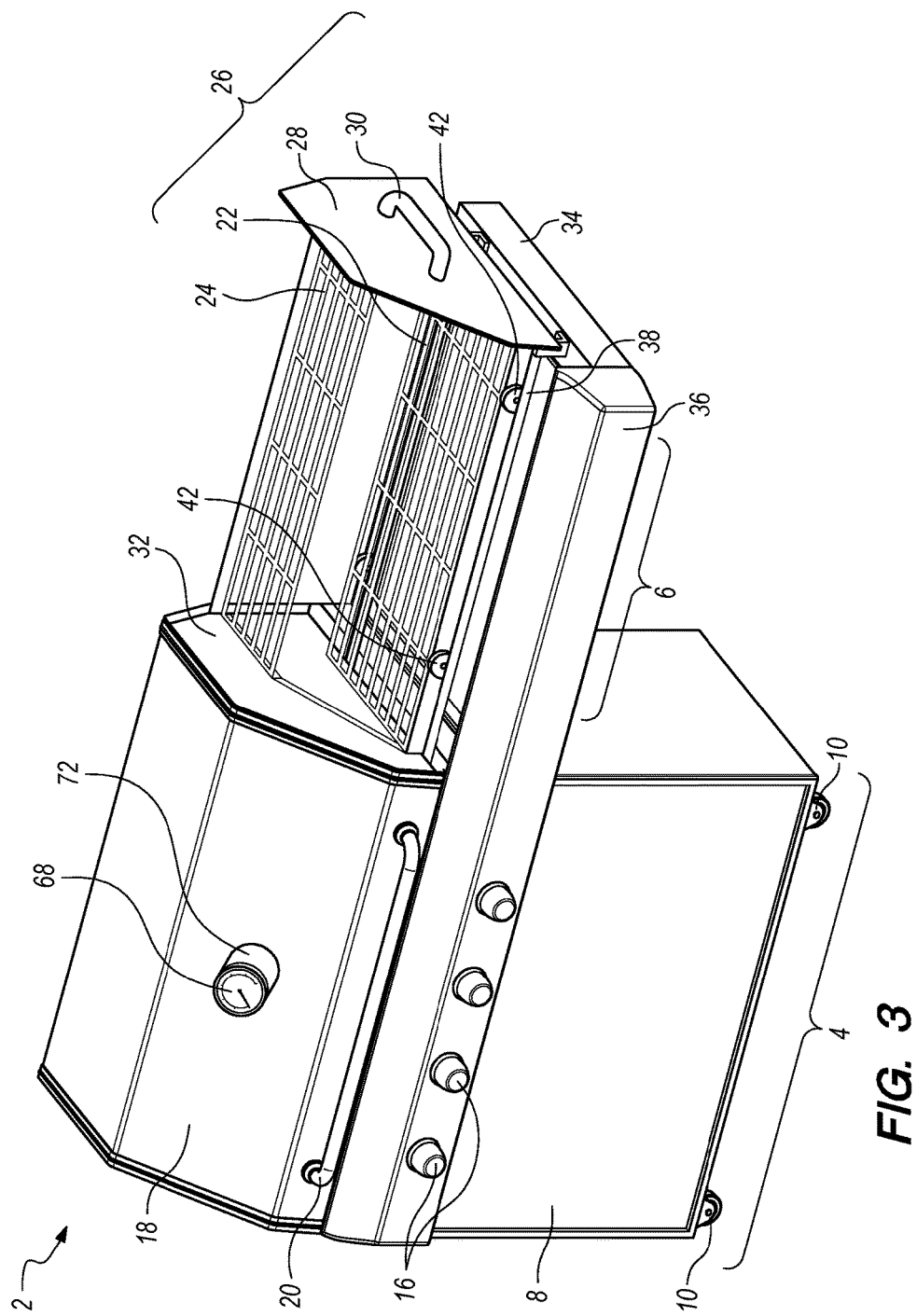
FIG. 3 is drawing of one embodiment of the present invention showing the lid in the closed position and the sliding assembly in a fully open position.

For example, in one embodiment, a single cooking rack 22 may be used. Likewise, a warming rack 24 (essentially an elevated cooking rack) may be used in conjunction with the cooking rack 22, as shown for example in FIG. 6. The warming rack 24 typically has all of the same qualities as the cooking rack 22, but is slightly elevated above the cooking rack 22 such that, unlike the food on the cooking rack 22, any food on the warming rack 24 is not directly exposed to the flame or other heat source. The cooking rack 22 and warming 24 together may be collectively referred to as the sliding assembly 26, which is shown separate from the grill 2 in FIG. 6. The sliding assembly 26 of the present invention is configured such that it may be slidably removed from the heating chamber 14 even when the lid 18 is in a closed position (as shown in FIGS. 2-3). In the embodiment including a warming rack 24, the entire warming rack 24 and cooking rack 22 assembly 26 may be slidably removed from the heating chamber 14 as a single unit. Alternatively, it is understood that the sliding assembly 26 may be designed such that the cooking rack 22 and warming rack 24 are each capable of being slidably removed from the heating chamber 14 separately (not shown). In one embodiment, the height of the cooking rack 22 and warming rack 24 may be adjustable.

Figure 4:
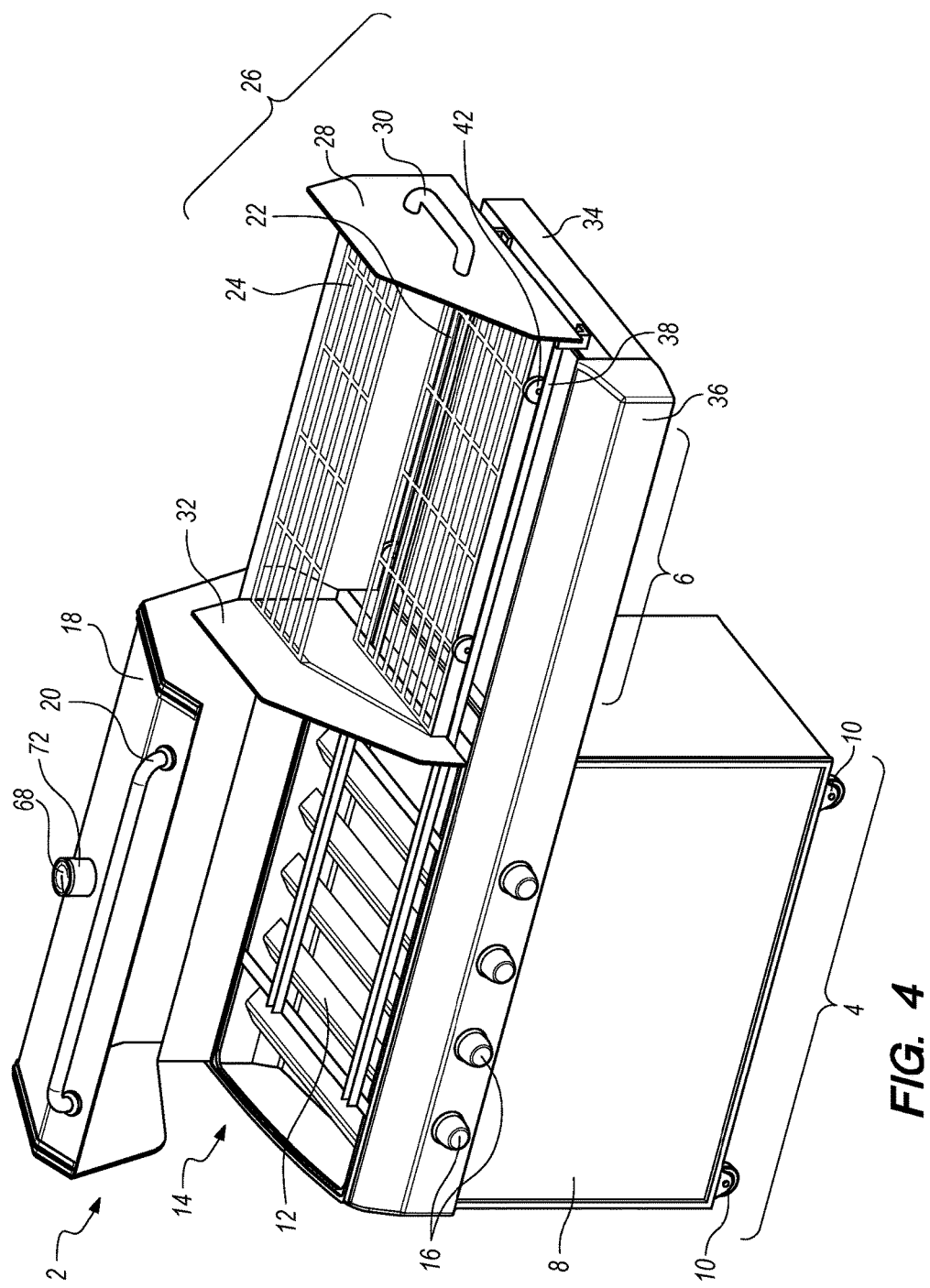
FIG. 4 is drawing of one embodiment of the present invention showing the lid in an open position and the sliding assembly in a fully open position.
Figure 5:
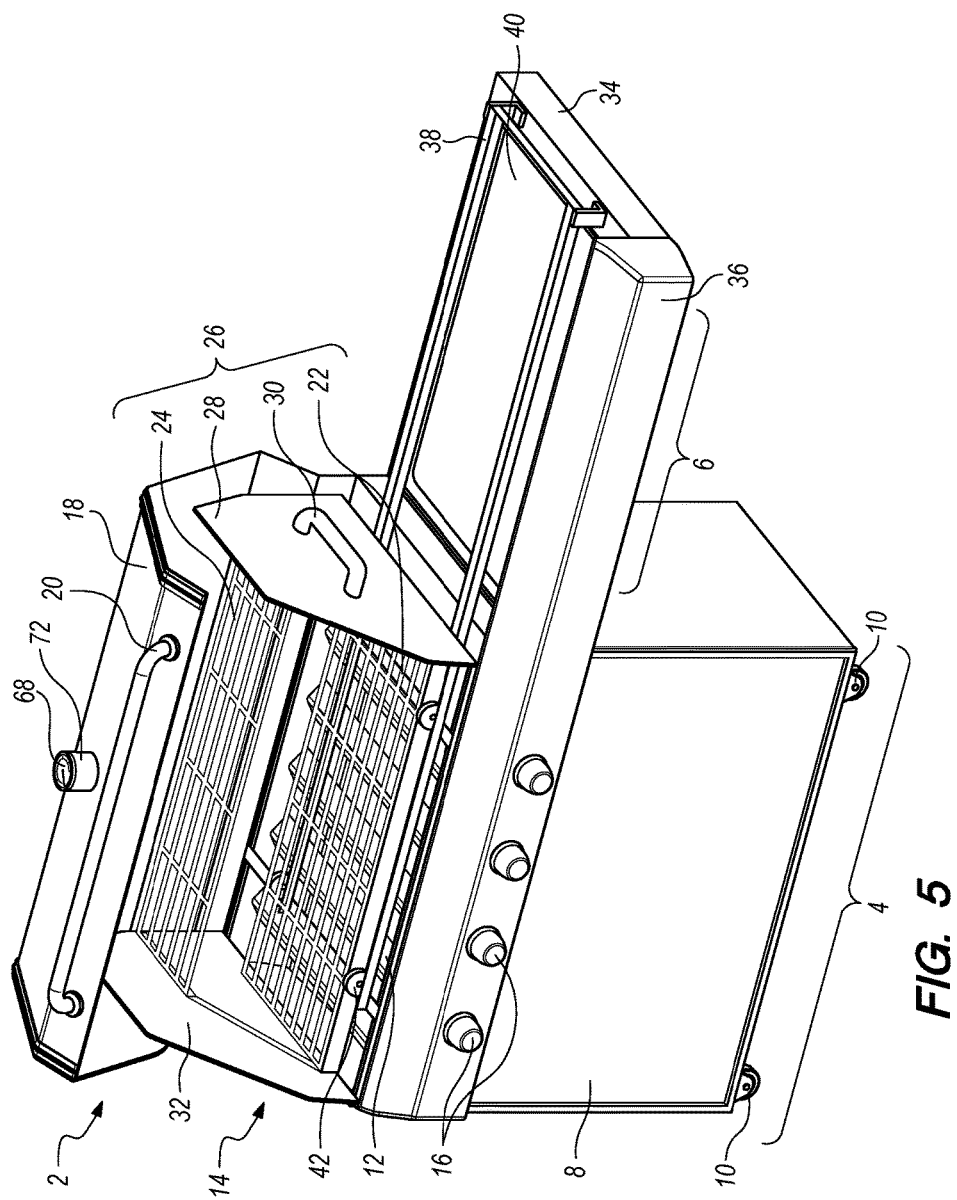
FIG. 5 is drawing of one embodiment of the present invention showing the lid in an open position and the sliding assembly in a closed position.
Figure 6:
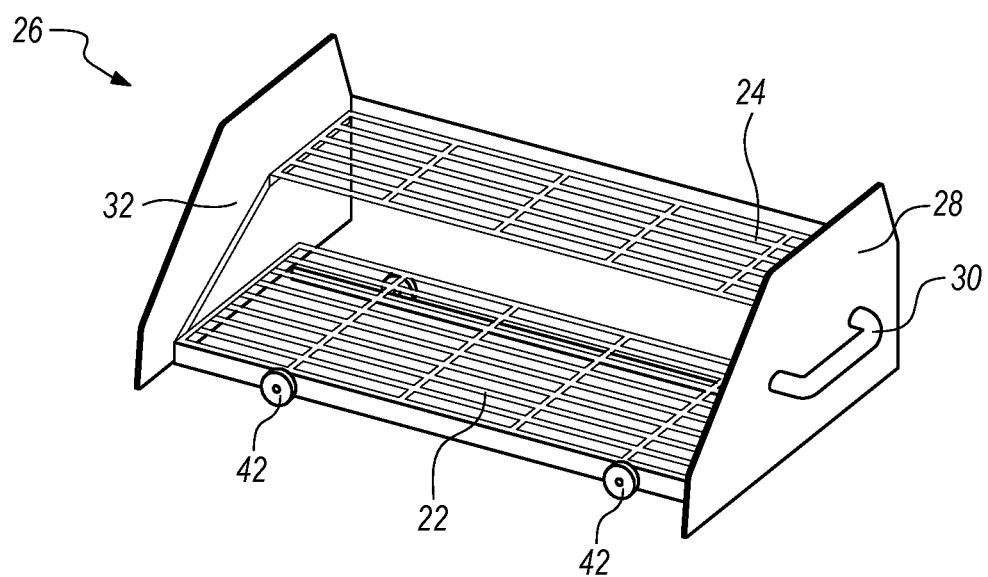
FIG. 6 is a drawing showing one embodiment of the sliding assembly of the present invention.
Figure 7:
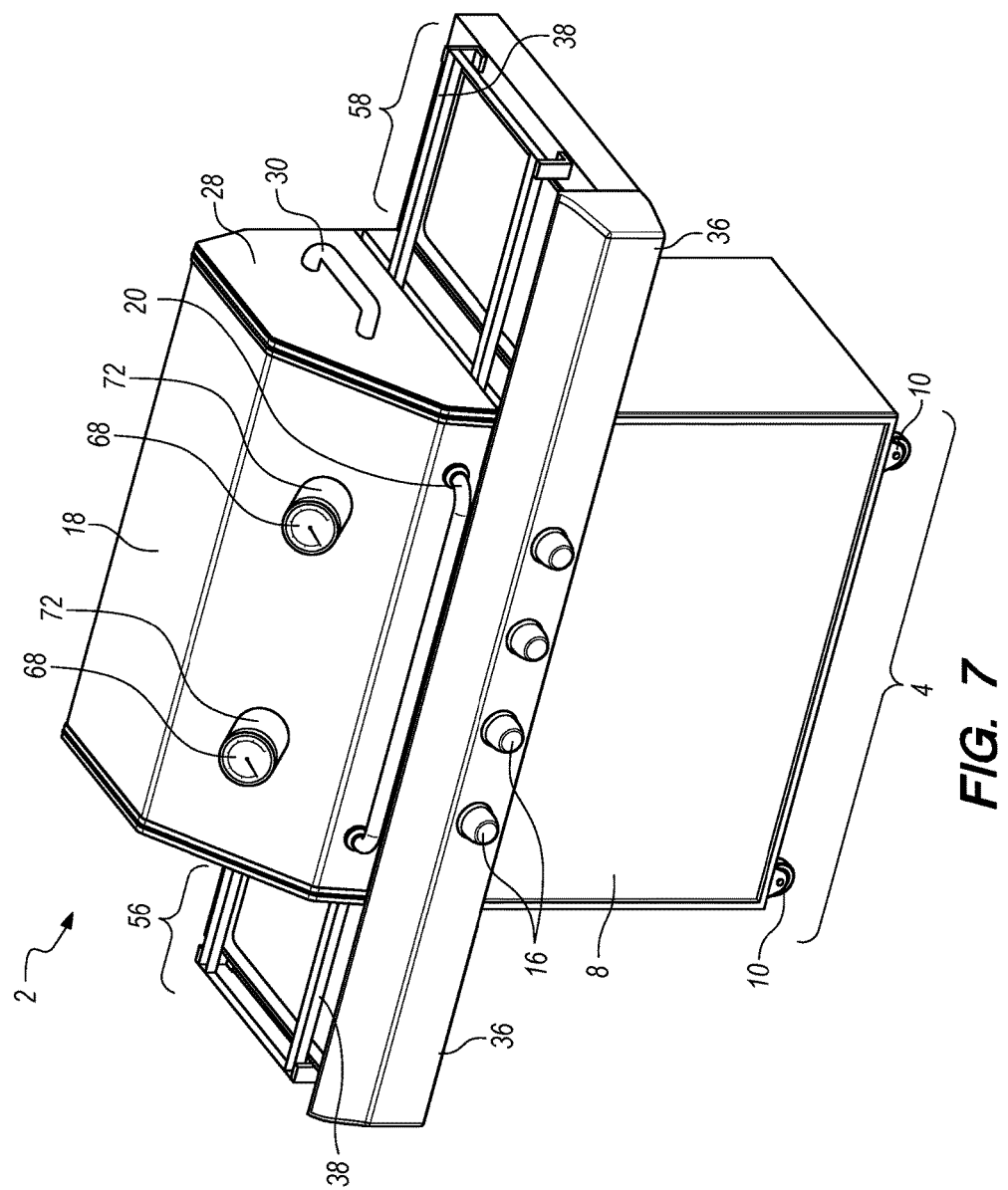
FIG. 7 is a drawing of an alternate embodiment of the present invention showing the lid and sliding assemblies in the closed position.
Figure 8:
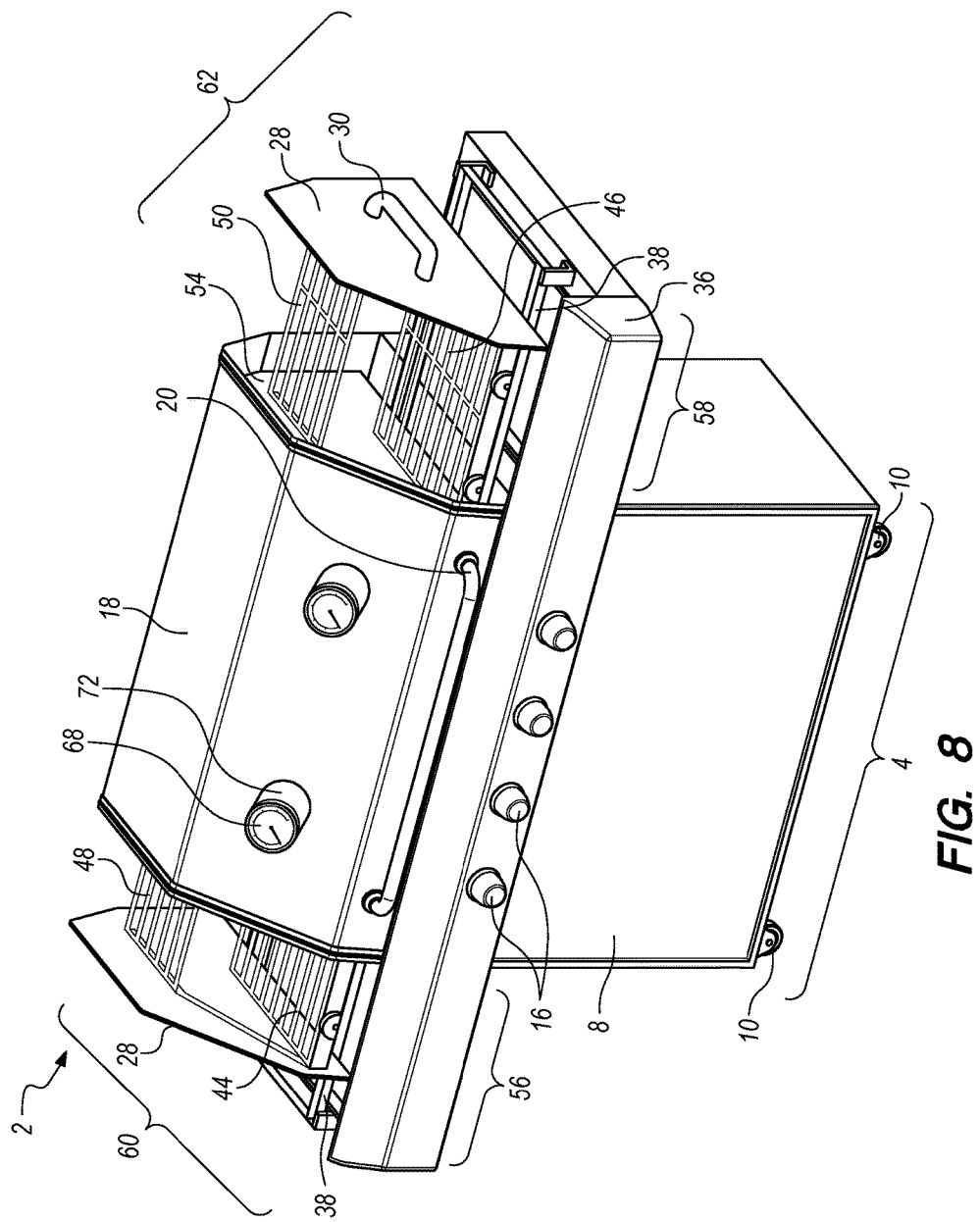
FIG. 8 is a drawing of an alternate embodiment of the present invention showing the lid in the closed position and the sliding assemblies each in a partially open position.

The sliding assembly 26 of the present invention is configured such that when the sliding assembly 26 is slidably removed from the heating chamber 14, the heating chamber 14 nevertheless remains sealed such that no heat, or a minimal amount of heat, is lost from the heating chamber 14. In order to facilitate this sealing, the sliding assembly 26 comprises an end plate 28, 32 on each end of the sliding assembly 26. The end plates 28, 32 are preferably made of the same material the lid 18 and other components are made of, which is preferably metal. One end plate 28 comprises a handle 30 for allowing the user to pull the sliding assembly 26 from the heating chamber 14. When the sliding assembly 26 is in the closed position (i.e. the cooking rack and/or warming rack is positioned entirely inside the heating chamber, as shown in FIGS. 1 and 5) the end plate 28 with handle 30 acts as the end wall of the lid 18. When the sliding assembly 26 is in the open position (described below) the end plate 32 on the end opposite the end plate 28 with handle 30 acts as the end wall of the lid 18, as shown in FIGS. 3-4. This allows the heating chamber 14 to remain substantially sealed even when the grilling surface 26 is slidably removed from the heating chamber 14. Thus, the user can access the contents of the grill 2 (i.e., the food being cooked on the grill) during the grilling process without opening the lid 18. This allows the user to check the food while keeping the internal temperature of heating chamber 14 at a sufficiently high temperature necessary for proper cooking. In addition, the user may turn, check, or otherwise access the food without needing to reach over the heating element 12, which can ultimately reduce the risk of burning or other harm to the user.

In order to facilitate the sliding of the sliding assembly 26, the table extension section 6 of the grill 2 is positioned next to the main body 4 of the grill 2. The table portion 6 extends outwardly from the main body 4 in the same direction that the sliding assembly 26 is intended to be removed, as shown in FIGS. 1-5. The table portion 6 preferably comprises a flat top surface 34 with one end attached to or positioned substantially adjacent to the same end of the main body 4 on which the metal plate 28 with sliding handle 30 is placed. In one embodiment (not shown) legs are positioned at the opposite end of the table portion 6 from the main body 4. As discussed above, in one embodiment, these legs may be fitted with wheels 10 for easy mobility. The top surface 34 and legs may be made of any durable material, such as stainless steel or other metal. The flat surface 34 of the table portion 6 serves multiple purposes. In one aspect, the flat surface 34 provides a support structure for the carriage portion 38 (described below) on which the sliding assembly 26 is configured to slide. In addition, the flat surface 34 of the tale portion 6 is configured such that a drip pan 40 or other removable component can be placed on the flat surface 34 under the carriage portion 38 such that when the sliding assembly 26 is slid from the heating chamber 14 onto the table extension 6, any fats, oils, or other liquids dripping from the food being cooked may fall onto the drip pan 40, which can later be removed from the table extension 6 and washed. This drip pan 40 may be manufactured integral to the table extension 6 (with a means for attaching and detaching the drip pan 40 to and from the table extension 6) or may be a separate piece that is simply laid upon the flat surface 34 of the table extension 6.

As mentioned above, the table portion 6 is used to support the carriage portion 38 on which the sliding assembly 26 slides. The carriage portion 38 is preferably a track system capable of receiving wheels 42 that are attached to the bottom of the sliding assembly 26, as shown in FIGS. 2-5. The carriage track system 38 extends from inside the heating chamber 14 to outside the heating chamber 14, with the portion outside the heating chamber 14 being supported by the table extension 6. Inside the heating chamber 14, the track system 38 is positioned above the heating element 12 such that the cooking rack 22 rests on the track system 38 during cooking, and therefore the cooking rack 22 and elevated warming rack 24 sit above the heating element 12. When the user wishes to check the food being cooked in the grill 2, the handle 30 on the end 28 of the sliding assembly 26 can be pulled, which in turn directs the sliding assembly 26 to slide along the track system 38 until it is removed from the heating compartment 14, as shown in FIGS. 2-4. The user can slide the sliding assembly 26 out of the heating compartment 14 until the end plate 32 on the opposite end of the sliding assembly 26 substantially seals the heat chamber 14, allowing for minimal heat loss. This feature is shown in FIG. 3.

Figure 10:
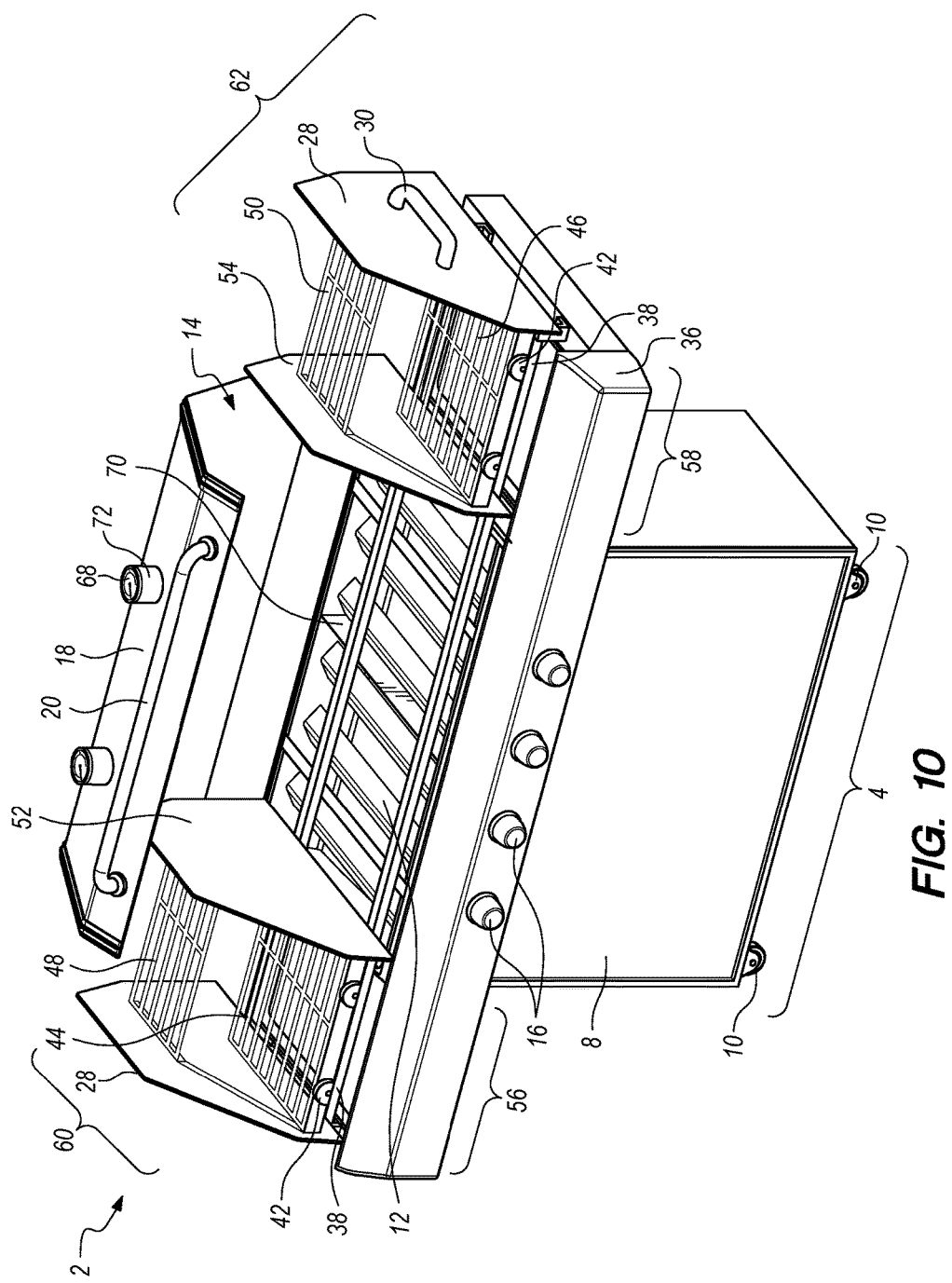
FIG. 10 is a drawing of an alternate embodiment of the present invention showing the lid in an open position and the sliding assemblies each in a fully open position.
Figure 11:
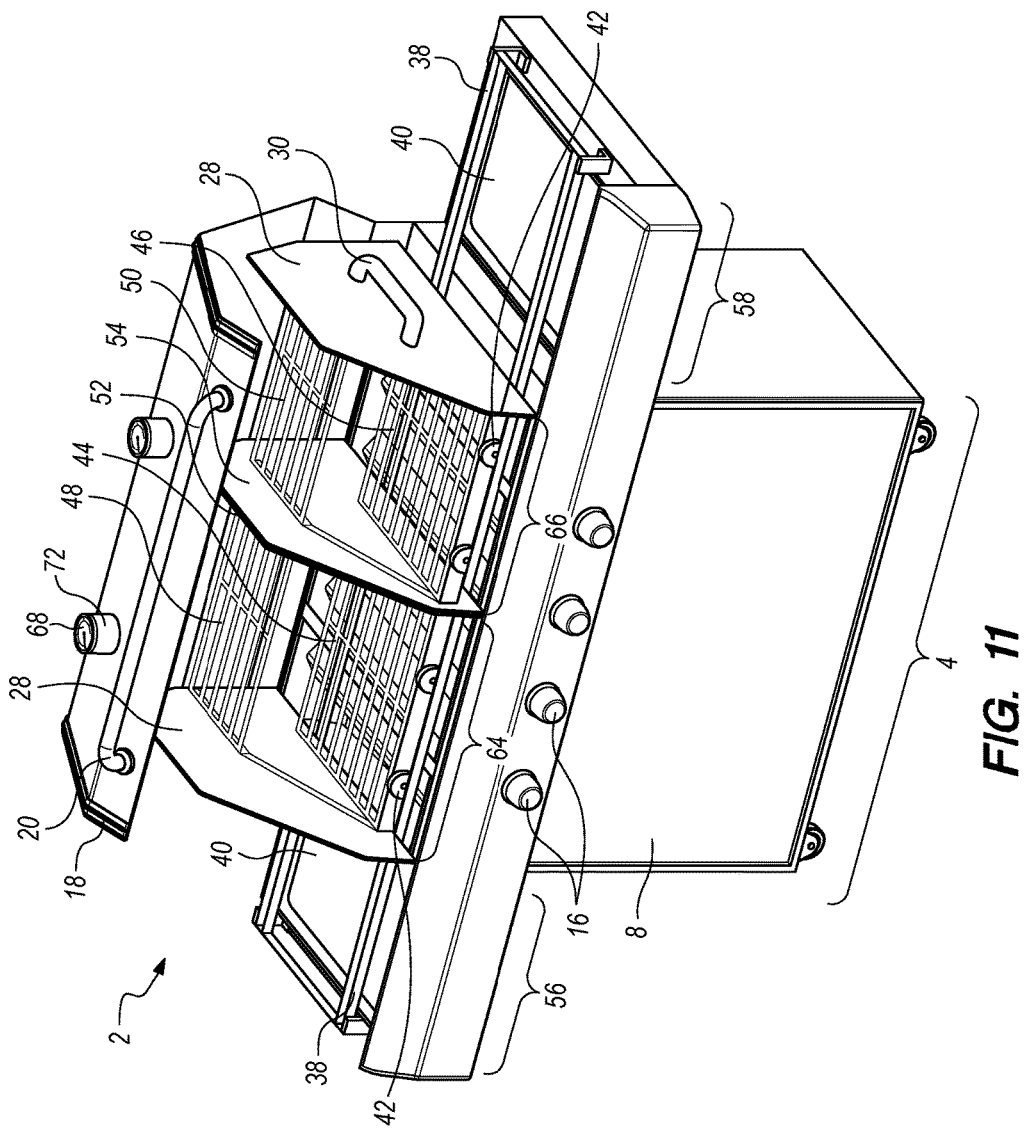
FIG. 11 is a drawing of an alternate embodiment of the present invention showing the lid in an open position and the sliding assemblies each in a closed position.
Figure 12:
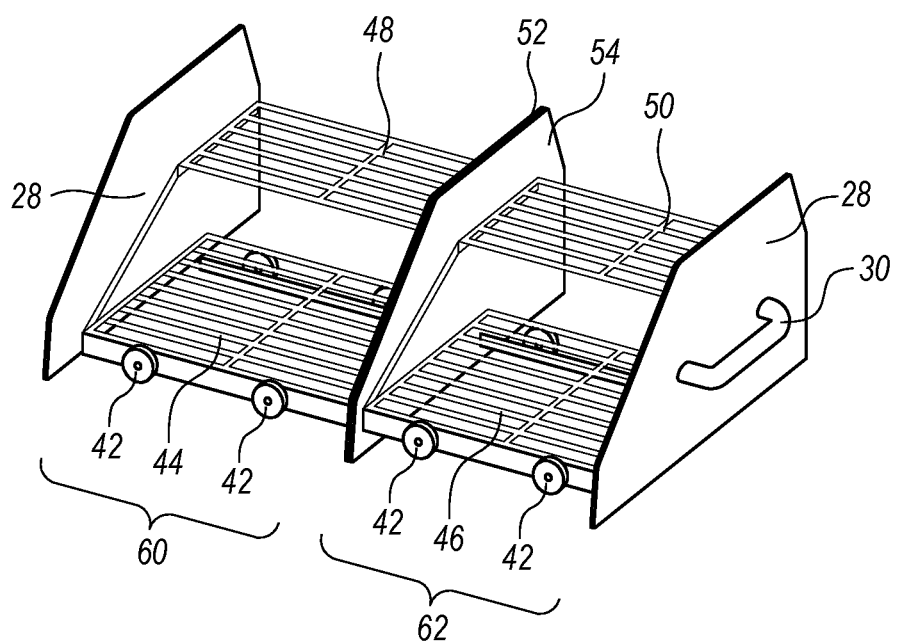
FIG. 12 is a drawing showing one alternate embodiment of the sliding assemblies of the present invention.

While the above description of one embodiment describes a grill 2 with a single sliding assembly 26, the invention is not so limited. For example, in one alternative embodiment, as shown in FIGS. 7-12, the cooking surface is split down the middle to create four separate grilling surfaces (two bottom cooking racks 44, 46 and two top warming racks 48, 50, as shown in FIG. 12). Each set of cooking racks 44, 46 and warming racks 48, 50, may be referred to as an individual sliding assembly 60, 62, and therefore in such an embodiment, two sliding assemblies 60, 62 are contemplated. Two additional metal plates 52, 54 are positioned, one on the internal end of each of the sliding assemblies 60, 62, such that when the sliding assemblies 60, 62 are removed from the heating chamber 14, the internal metal plates 52, 54 act to seal the ends of the heating chamber 14 in a manner similar to that of the embodiment described above. When multiple sliding assemblies 60, 62 are used, however, it is contemplated that one sliding assembly 60 slides out one end of the heating chamber 14 while the other sliding assembly 62 slides out the opposite end of the heating chamber 14. Thus, the middle plate 52 of one sliding assembly 60 seals one end of the heating chamber 14 while the middle plate 54 of the other sliding assembly 62 seal the opposite end of the heating chamber 14. In the embodiment implementing multiple sliding assemblies 60, 62, it is understood that multiple table extensions 56, 58 may also be needed to support the individual sliding assemblies 60, 62 when removed from the heating chamber 14. For example, as shown in FIGS. 7-11, a table extension 56, 58 may be placed on each end of the main body 4 of the grill 2. As with the alternative embodiment, the multi sliding assembly embodiment may also use wheels 10 on the bottom of the legs (not shown) of the table extension 56, 58 (in addition to wheels 10 on the bottom of the main body 4 of the grill 2) in order to facilitate easy moving of the grill 2.

Figure 9:
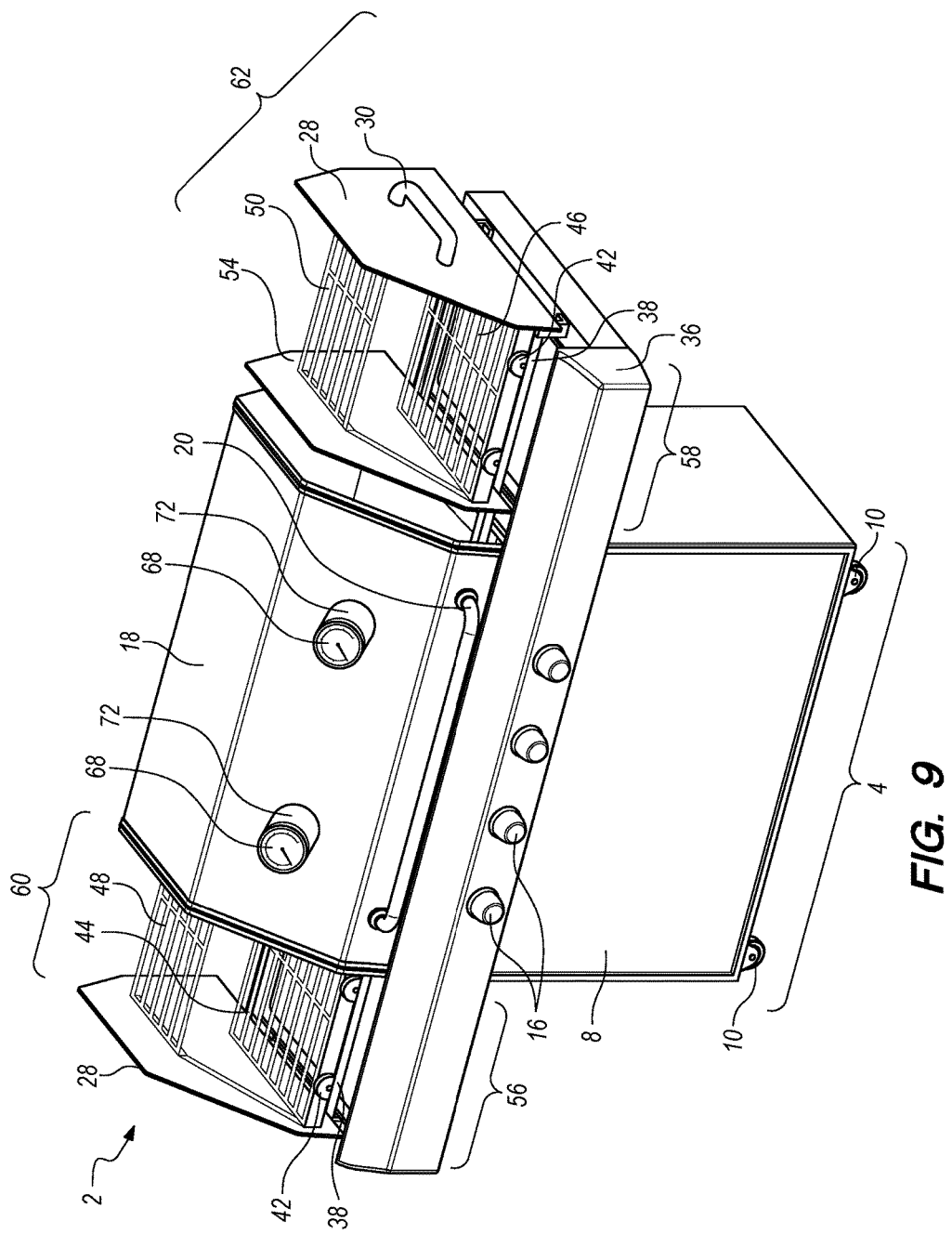
FIG. 9 is a drawing of an alternate embodiment of the present invention showing the lid in the closed position and the sliding assemblies each in a fully open position.
Figure 14:
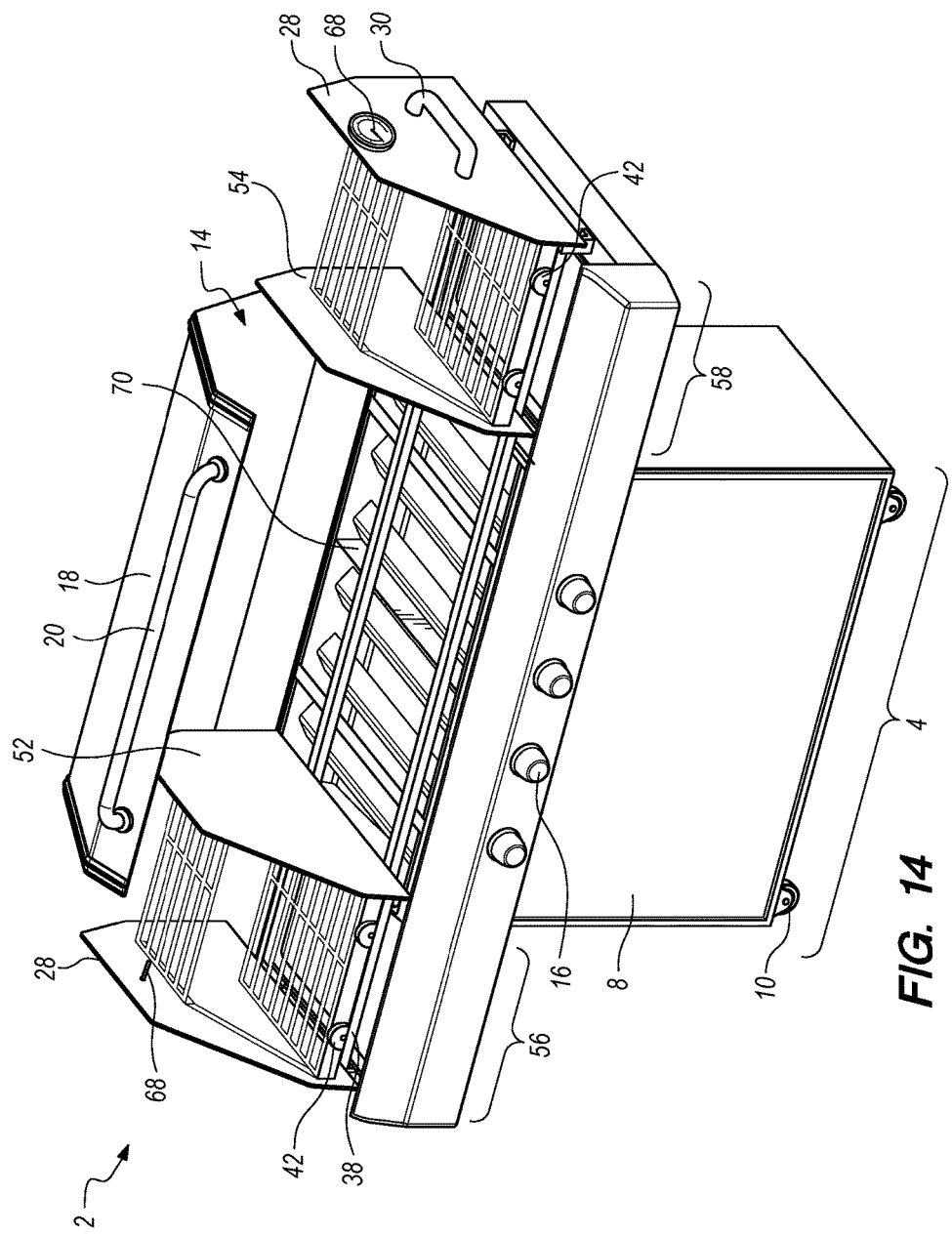
FIG. 14 is a drawing of on alternate embodiment of the present invention showing a thermometer in the end panel of multiple sliding assemblies.

As shown in FIG. 9, the left sliding assembly 60 is configured to slide on the left table extension 56 (in the same manner as described above with reference to the single sliding assembly 26 embodiment) and the right sliding assembly 62 is configured to slide onto the right table extension 58. In such an embodiment, because the cooking racks 44, 46 and warming racks 48, 50 of each sliding assembly 60, 62 are smaller than when only a single sliding assembly 26 is used (compare FIGS. 6 and 12), the table extension 56, 58 on each end of the grill 2 may also be smaller. Furthermore, because each of the sliding assemblies 60, 62 has an internal plate wall 52, 54 (as shown in FIGS. 10-12) such an embodiment allows for two separate temperature zones 64, 66 within the heating chamber 14, as shown in FIG. 11. This allows the user to cook different kinds of foods in each temperature zone 64, 66, while maintaining an accurate temperature in that zone, even if the temperature of the other zone must be increased. This embodiment also allows the user to check the contents of one temperature zone 64, 66 by slidably removing the sliding assembly 60, 62 for that temperature zone 64, 66 from the heating chamber 14 at the same time as the food in the other temperature zone 64, 66 stays inside the heating chamber 14 to cook further. In one embodiment, it is understood that the lid 18 of the grill 2 may also be separated into two portions (not shown), each covering one of the multiple temperature zones 64, 66, which would allow the user to completely open the lid 18 of one temperature zone 64, 66 (such as for cleaning, loading of food, or for any other purpose) while leaving the other temperature zone 64, 66 substantially sealed. In order to facilitate better temperature control in each of the temperature zones 64, 66, an additional dividing panel 70 may be inserted into the grill 2 in between the heating elements of the different zones 64, 66, as shown in FIGS. 10 and 14. The dividing panel 70 serves to line up with the middle plates 52, 54, which assists in separating each temperature zone 64, 66 more completely. The dividing panel 70 is preferably made of the same material as the middle plates 52, 54, which may be metal. In addition, the dividing panel 70 may be manufactured integral to the grill 2 or may be a removable attachment piece.

Figure 13:
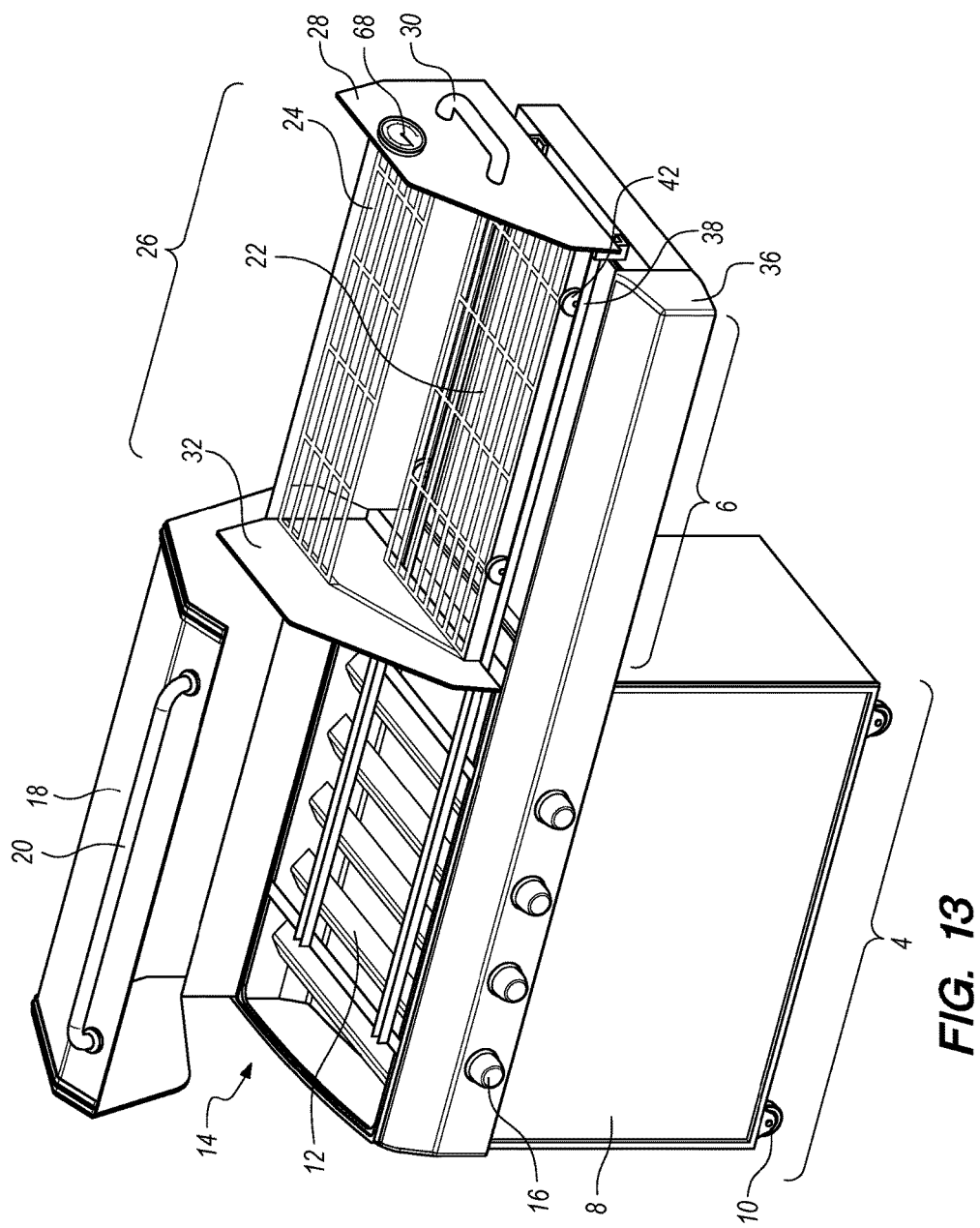
FIG. 13 is a drawing of one alternate embodiment of the present invention showing the thermometer in the end panel of the sliding assembly.

In order to assist in maintaining the temperature of the heating chamber 14 (or of each temperature zone 64, 66 in the heating chamber 14 when two zones are implemented) a thermometer 68 (or multiple thermometers 68 in the case of multiple heating zones 64, 66) may be integrated into the grill 2. In the preferred embodiment, the thermometer(s) 68 is/are integrated into the lid 18 of the grill 2 such that the probe of the thermometer(s) 68 is/are positioned inside the heating chamber 14 and the face of the thermometer 68 is positioned outside the heating chamber 14 so that it can be easily read by the user. In one embodiment, the thermometer 68 may be in a raised portion 72 that extends outwardly from the lid 18. The raised portion prevents the probe of the thermometer(s) 68 from interfering with the movement of the sliding assembly 26 (or multiple sliding assemblies 60, 62) by striking the corresponding inner plate wall during movement. The raised portion 72 is configured such that one end remains open to the heating chamber 14 and the other end (the end opposite the heating chamber 14) is sealed by the face of the thermometer 68 at some point a distance from the lid 18. This allows the probe of the thermometer 68 to get an accurate reading of the temperature, without hindering the movement of the internal metal plates 32, 52, 54 attached to the sliding assembly 26 or assemblies 60, 62. A separate thermometer 68 for each heating section is contemplated. Because the face of the thermometer 68 acts to seal the second end of the raised portion 72, the raised portion 72 is preferably substantially the same shape as the thermometer 68 face. For example, in one embodiment the thermometer 68 face may be substantially circular and the raised portion 72, therefore, may be substantially cylindrical. In one alternate embodiment, the thermometer(s) 68 is/are positioned on the end plate 28 instead of the lid 18, as shown in FIGS. 13-14.

The present invention has been described with reference to certain preferred and alternative embodiments that are intended to be exemplary only and not limiting to the full scope of the present invention.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The invention claimed is:

1. A cooking device comprising:
 a. a heating chamber having a first end and a second end;
 b. a track system positioned inside the heating chamber and extending outside the first end of the heating chamber and the second end of the heating chamber;
 c. a cooking assembly positioned on the track system, wherein the cooking assembly comprises a first cooking surface and a second cooking surface, wherein the first cooking surface is slidably removable from the first end of the heating chamber along the track system, further wherein the second cooking surface is slidably removable from the second end of the heating chamber along the track system; and
 d. a first end plate connected to the first cooking surface, wherein the first end plate is shaped to close the first end of the heating chamber when the first cooking surface is slidably removed from the first end of the heating chamber; and
 e. a second end plate connected to the second cooking surface, wherein the second end plate is shaped to close the second end of the heating chamber when the second cooking surface is slidably removed from the second end of the heating chamber.

2. The cooking device of claim 1, wherein the heating chamber comprises first and second heating zones, and wherein the first cooking surface is configured to slide into the first heating zone and the second cooking surface is configured to slide into the second heating zone.

3. The cooking device of claim 1, further comprising at least one horizontal surface positioned outside the heating chamber and configured to support the track system extending outside the heating chamber.

4. The cooking device of claim 1, further comprising at least one thermometer attached to the heating chamber.

5. The cooking device of claim 2, wherein a first thermometer is attached to the heating chamber and is configured to record a temperature in the first heating zone.

6. The cooking device of claim 5, wherein a second thermometer is attached to the heating chamber and is configured to record a temperature in the second heating zone.

7. The cooking device of claim 1, further comprising a base support structure.

8. The cooking device of claim 7, further comprising a plurality of wheels connected to the base support structure.

9. The cooking device of claim 6, further comprising a first lid over the first heating zone of the heating chamber, and wherein the first thermometer is attached to a raised portion extending outwardly from the first lid.

10. The cooking device of claim 9, further comprising a second lid over the second heating zone of the heating chamber, and wherein the second thermometer is attached to a raised portion extending outwardly from the second lid.

11. A cooking device comprising:
 a. a heating chamber having a first end and a second end;
 b. a track system positioned inside the heating chamber and extending outside the first end of the heating chamber;
 c. a first cooking assembly positioned on the track system, wherein the first cooking assembly comprises:
  i. a first end and a second end;
  ii. a first cooking surface; and
  iii. a second cooking surface
   wherein the first cooking surface is slidably removable from the first end of the heating chamber along the track system, whereby removing the first cooking assembly from the first end of the heating chamber simultaneously removes the first cooking surface and the second cooking surface from the heating chamber;

d. a first end plate connected to both the first cooking surface and the second cooking surface, wherein the first end plate is shaped to close the first end of the heating chamber when the cooking assembly is inside the heating chamber; and e. a second end plate connected to both the second end of the first cooking surface and the second end of the second cooking surface, wherein the second end plate is shaped to close the first end of the heating chamber when the cooking assembly is slidably removed from the first end of the heating chamber.

12. The cooking device of claim 11, further comprising a second cooking assembly comprising:

a. a first end and a second end;

b. a third cooking surface; and c. a fourth cooking surface wherein the second cooking assembly is slidably removable from the second end of the heating chamber along the track system, whereby removing the second cooking assembly from the second end of the heating chamber simultaneously removes the third cooking surface and the fourth cooking surface from the heating chamber.

13. The cooking device of claim 12, wherein the first cooking assembly is slidably positionable inside a first heating zone of the heating chamber and the second cooking assembly is slidably positionable inside a second heating zone of the heating chamber.

14. The cooking device of claim 13, further comprising a lid hingedly connected to the heating chamber, wherein the lid encloses the heating chamber.

15. The cooking device of claim 14, wherein the lid comprises a first lid area and a second lid area, wherein the first lid area comprises a thermometer to read a temperature of the first heating zone and wherein the second lid area comprises a thermometer to read a temperature of the second heating zone.

16. The cooking device of claim 11, further comprising a third end plate, wherein the third end plate is positioned to close the first end of the heating chamber when the first cooking assembly is positioned inside the heating chamber, further wherein a thermometer is positioned on the third end plate to read a temperature of the heating chamber.

* * * * *